United States Patent [19]

Chyung et al.

[11] Patent Number: 4,719,151
[45] Date of Patent: Jan. 12, 1988

[54] LAMINATED CERAMIC STRUCTURE

[75] Inventors: Kenneth Chyung, Painted Post, N.Y.; Reid F. Cooper, Madison, Wis.; Kishor P. Gadkaree; Ronald L. Stewart, both of Big Flats, N.Y.; Mark P. Taylor, Painted Post, N.Y.

[73] Assignee: Corning Glass Works, Corning, N.Y.

[21] Appl. No.: 861,303

[22] Filed: May 9, 1986

[51] Int. Cl.⁴ .................................. B32B 5/12
[52] U.S. Cl. ..................... 428/428; 428/427; 428/688; 428/689; 428/699; 428/701; 428/702; 428/911
[58] Field of Search ............... 428/426, 427, 428, 688, 428/689, 699, 432.113, 911; 501/32, 90, 95

[56] References Cited

U.S. PATENT DOCUMENTS

| | | | |
|---|---|---|---|
| 3,473,999 | 10/1969 | Muchow | 428/427 |
| 3,509,833 | 5/1970 | Cook | 428/911 |
| 3,516,898 | 6/1970 | Cook | 428/911 |
| 3,559,210 | 2/1971 | Hansen | 428/911 |
| 3,564,587 | 2/1971 | Ellis | 428/427 |
| 3,729,372 | 4/1973 | Matchen et al. | 428/427 |
| 3,929,494 | 12/1975 | Venes | 501/32 |
| 4,307,140 | 12/1981 | Davis | 428/416 |
| 4,554,197 | 11/1985 | Chyung et al. | 428/426 |

*Primary Examiner*—George F. Lesmes
*Assistant Examiner*—S. A. Gibson
*Attorney, Agent, or Firm*—C. S. Janes, Jr.

[57] ABSTRACT

There is disclosed a laminated ceramic structure including a facing member and a backing member, the two members being bonded together either directly or through an intermediate layer, the facing member being formed from a very hard ceramic such as a carbide having a $KHN_{100}$ value in excess of 1000 kg/mm$^2$, the backing member being a glass or glass-ceramic matrix having an enhanced capability or absorbing impact energy, preferably being fiber reinforced and having an energy absorbing capacity in excess of 10 KJ/m$^2$.

14 Claims, 2 Drawing Figures

LAMINATED CERAMIC STRUCTURE

BACKGROUND

This invention relates to a laminated structure comprising at least two layers of ceramic material, the properties of the material in one layer being distinctly different from those of the material in the other layer. The laminated ceramic structure is particularly useful in providing impact resistance, especially resistance to projectile penetration. It may also prove useful where severe erosive conditions are encountered, as in such diverse items as material mixers and exhaust components on jet engines.

It has been customary to employ metal tile or cladding as protection against such adverse influences as projectile penetration or erosive action by the environment. The need for an ever-increasing degree of resistance has been met, but at the expense of severe weight problem. Accordingly, it has recently been proposed to employ a glass-ceramic material having a high thermal coefficient of expansion, the glass-ceramic being used either alone or bonded to a steel backing plate.

Laminated glass articles are also known. Thus, the safety glass used in auto windshields is composed of glass sheets joined with a thin interlayer of plastic. The laminated glass may be made thicker and strengthened in making bullet-proof glass.

While these structures have met some needs, there has remained a continued interest in obtaining greater resistance capability per unit weight.

PURPOSES OF THE INVENTION

A basic purpose is to provide a laminated structure having improved impact resistance.

Another purpose is to provide a structure that is resistant to penetration by a shaped projectile.

A further purpose is to provide a structure having resistance to both impact and abrasion.

Another purpose is to provide a structure that is impact and/or erosion resistant, and that is relatively light weight.

SUMMARY OF THE INVENTION

Our invention is a laminated ceramic structure comprising a facing member bonded to a backing member. The facing member is composed of a very hard ceramic material, and the backing member is a glass or glass-ceramic matrix, preferably fiber reinforced and having an enhanced capability of absorbing impact energy.

The faceplate may have a hardness such that the $KHN_{100}$ value is in the range of 700 to 3000 kg./mm$^2$. Suitable ceramics include carbides, borides, and alumina. The backing member is preferably a fiber or whisker reinforced glass or glass-ceramic having an impact toughness value of 10 to 40 KJ/m$^2$. The plates may be bonded together by hot pressing or by a frit-bonding process.

An embodiment of the invention that is particularly useful in an erosive environment may embody layers of the same or similar glass-ceramic matrices. Thus, the matrix on the facing or exposed layer is reinforced with whiskers and tends to be hard. Conversely, the matrix of the backing layer, which may be the same as in the facing, is reinforced with fibers and tends to be tough and resistant to brittle fracture.

PRIOR LITERATURE

U.S. Pat. No. 3,509,833 (Cook) discloses armor plate in which a force-absorbing base is composed of a plurality of resin-impregnated layers of glass fabric, the glass fabric being woven in a defined manner, and a facing layer of alumina ceramic tiles (over 85% alumina) sealed to the base with a flexible adhesive layer.

U.S. Pat. No. 3,559,210 (Hansen) discloses ceramic body armor having a facing of hard ceramic such as boron carbide, and layers of glass fabric bonded with resin and delaminated on impact.

U.S. Pat. No. 4,307,140 (Davis) discloses a laminated article comprising a plurality of abrasion-resistant ceramic tiles secured to an elastomeric polyurethane cushioning support by means of a multitude of short thin fibers embedded within an epoxy resin bonded to the tiles.

U.S. Pat. No. 4,358,772 (Leggett) discloses a ceramic broadband radome comprising alternating layers of silicon nitride and fused silica, there being a silicon nitride layer at each face and one internal layer. The article claims resistance to thermal stresses, particle impact, rain erosion, and crack propagation, while maintaining high transmission efficiency.

GENERAL DESCRIPTION

The invention derives from our discovery that two distinctly different, ceramic-type materials, may be laminated together to provide a composite that is resistant to penetration by impact of a shaped charge, resistant to particle erosion, and is relatively light in weight.

The unique combination of properties provided includes:

1. A hardness of $(KHN)_{100}$ in the faceplate material ranging from 700 up to 3000 kg./mm$^2$, preferably at least 2000.

2. A high degree of energy absorption in the backplate, that is, a tnedency to absorb energy without complete crack propagation.

3. A strong interfacial bond which resists separation and resultant spalling of the faceplate.

4. Relative light weight.

In the inventive structure a relatively hard ceramic fireplace is tightly bonded, either directly or through an intermediate, with a glass or glass-ceramic backplate. In the composite, the latter has a very high capability of absorbing impact energy. The faceplate is capable of shattering armor-piercing projectiles at high impact velocity. While the face plate tends to break up itself, two significant events occur. The backplate tends to absorb and spread out the impact energy thereby resisting penetration. Also, the adhesive bond prevents the faceplate pieces from spalling off the backplate.

The faceplate may be composed, for example, of any ceramic having a hardness greater than about 700 kg./mm$^2$ and preferably in excess of 2000 kg./mm$^2$. These include silicon carbide (SiC), boron carbide ($B_4C$), titanium boride ($TiB_2$), siliconoxynitride (SiON), and alumina ($Al_2O_3$), each in monolithic form.

Hardness measurements are reported as Knoop hardness numbers measured with a specified weight. Thus, $KHN_{100}$ signifies the number observed as characteristic of a material when a 100 gram weight is used in the measuring device. Glasses and glass-ceramics tend to measure in a range of 500–800 kg/mm$^2$, while an exceptional material may approach 1000 kg/mm$^2$.

The present faceplate materials must exceed 700 kg/mm². As a practical matter their hardness values may extend up to about 3000 kg/mm². Values in the range of 2000–3000 are generally preferred.

In its simplest form the backplate, or backing layer, may be a glass or glass-ceramic material. While such materials, when used along, show no particular merit, they do appear to absorb impact energy reasonably well when used in a composite as a backing layer.

In general, however, we prefer to employ a backing layer or backplate composed of a fiber or whisker reinforced glass or glass-ceramic. Some examples are:

1. Glasses and glass-ceramics reinforced with silicon carbide fibers ad disclosed, for example, in U.S. Pat. Nos. 4,314,852 and 4,324,843.

2. Glasses and glass-ceramices reinforced with silicon carbide whiskers, e.g., whiskers available under the designations ARCO SC-9 and SC-10. As noted later, these composites may also provide a hard facing.

3. Glasses and glass-ceramics reinforced with graphite fibers such as disclosed in U.S. Pat. No. 4,511,663 and patents cited there.

The characteristic or property of primary interest in the backing member is the capability of absorbing impact energy. This is typically measured in kilo-joules per square meter (KJ/m²), and is measured by the Charpy or Izod technique for measuring energy absorption.

It is well recognized that notching a ceramic test piece tends to have a catastrophic effect on energy absorption. Thus, monolithic ceramics, which may have values up to 10 KJ/m² in an unnotched condition, may lose over 90% of this value when notched.

We have found that unnotched glasses and glass-ceramics in a tightly bonded composite, particularly if fiber reinforced, may have energy absorption values in excess of 10 KJ/m², and may range as high as 40 KJ/m². Typical values fall within the 20–30 KJ/m² range. Of particular interest is the fact that, even when notched, the backing layer tends to retain over one-half, and up to two-thirds, of its energy absorbing capability.

Where resistance to penetration is of paramount concern, the backing layer will usually be of substantially greater thickness than the faceplate. However, where erosion resistance is of greater interest, the thicknesses may be equal, or the faceplate may even be of greater thickness.

A particular embodiment that is useful for erosive environments is one in which the matric materials in the layers are the same or similar glasses or glass-ceramics. The reinforcing medium employed will differ, however. Thus, the backing layer is reinforced with continuous fibers to provide a tough support, while the facing is reinforced with whiskers to provide greater hardness and thus greater erosion/wear resistance. The continuous fibers in the composite backing layer may be uniaxially, biaxially, or multiaxially oriented.

The relative thicknesses of the whisker reinforced facing layer and the fiber reinforced backing member, and the moduli of the two layers, have important influences on properties and hence potential uses. A lower modulus layer transfers some of its load to a higher modulus layer. Therefore, if a fiber reinforced layer is to carry the primary load, then the whisker reinforced layer requires a modulus no greater than that of the backing layer. The thickness ratio of the faceplate to the backing layer should be much less than unity. The faceplate provides abrasion resistance, while the backing layer is the primaryload carrier.

On the other hand, if the primary load is carried by the whisker reinforced front member, the thickness ratio should be much greater than unity, and the modulus of the whisker reinforced layer should exceed that of the fiber reinforced member. The modulus may be altered by (1) changing the volume fraction of whiskers in the facing member, (2) changing the fiber orientation in the backing layer, and (3) selection of fibers used for reinforcement.

In constructing the laminated structure of the invention, the face plate and backing plate are usually preformed and then sealed together at their inner or facing surfaces. The plates may be sealed either with or without an intermediate sealing layer. Thus, a glass frit may be applied between the plates and the assembly heated to a temperature at which the glass softens and wets the surfaces of the plates. Alternatively, the plates may be assembled and subjected to hot pressing. This produces an in situ seal between the plates.

As a general rule, a thermal expansion mismatch up to about $20 \times 10^{-7}$ can be tolerated between the backing layer and faceplate, although a value less than $10 \times 10^{-7}$ is preferred. However, a greater mismatch may occur under some circumstances; for example, with carbon fiber reinforced glasses as a backing. In such a case thermal expansions near zero, or even negative values, may occur. In such a case, one or more interlayers of an intermediate thermal expansion material may be employed to provide a graded thermal expansion.

DESCRIPTION OF THE DRAWING

The invention is further illustrated in the accompanying drawing wherein,

FIG. 1 shows a laminated structure 10, composed of a faceplate 12 and a backing member 14, which may have been integrally united by hot pressing.

FIG. 2 shows a modified structure 20 wherein a faceplate 22 is united to a backing layer 24 by an intermediate layer or film 26 composed of one or more glass-fiber composites. In this structure, faceplate 22 may be silicon carbide, backing 24 may be a glass or glass-ceramic reinforced with carbon fibers, and layer 26 may be a glass reinforced with silicon carbide fibers.

SPECIFIC EMBODIMENTS

EXAMPLE 1

Figure 1:
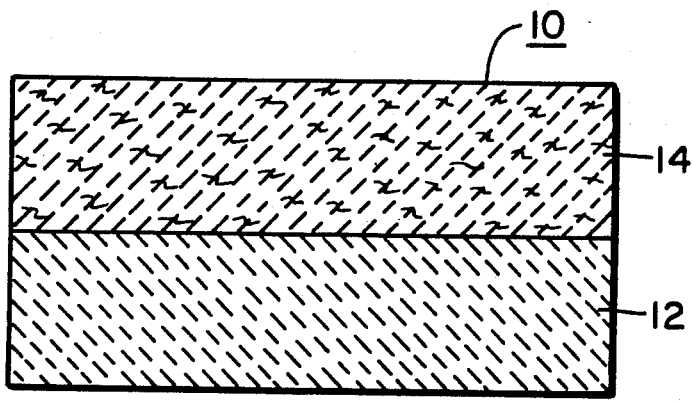
FIG. 1 depicts, in cross-section, a laminated structure in accordance with the invention.
Figure 2:
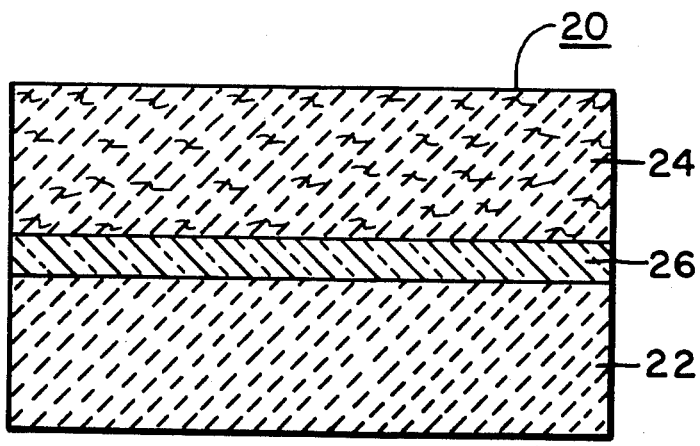
FIG. 2 is a modified form illustrating use of a graded thermal expansion.

A thin layer of alpha-silicon carbide (available from Carborundum under trademark HEXLOY) was sintered to produce a 5 mm. thick facing plate. The sintered material had a thermal coefficient of expansion of about $45 \times 10^{-7}/°C.$, and a $KHN_{100} = 2800$ Kg./mm².

A backing layer was assembled by forming a composite consisting of silicon carbide fibers in an aluminosilicate glass matrix. This layer was produced in accordance with the practice disclosed in U.S. application Ser. No. 734,634 filed Apr. 15, 1985, now U.S. Pat. No. 4,626,515. The sintered SiC plate and the fiber-reinforced glass backing plate were assembled and hot pressed at a temperature of about 1100° C. at about 1000 psi pressure.

EXAMPLE 2

The procedure of Example 1 was repeated with the additional forming of a face plate composed of hot pressed boron carbide (B$_4$C) available from Norton. This faceplate had a coefficient of thermal expansion of about $58 \times 10^{-7}/°C$. and a KHN$_{100}$ of about 2800 kg./mm$^2$.

The SiC faceplate and B$_4$C faceplate were assembled on either side of the fiber-reinforced glass layer. This assembly was then hot-pressed as described in Example 1.

EXAMPLES 3 and 4

SiC and B$_4$C faceplates were prepared as in Example 2. Each faceplate was then bonded to a SiC fiber-reinforced glass layer using an intermediate layer of glass frit. The sealing frit was a PbO-TiO$_2$-B$_2$O$_3$-SiO$_2$ soft sealing glass taht was comminuted to a powder and mixed with an amyl acetate vehicle to form a thin, smooth-flowing slurry. The slurry was spread as a thin uniform film on the inner surface of each faceplate. The faceplate and reinforced glass backing plate were then assembled with the frit film intermediate. The plates were lightly pressed together and heated at 620° C. for one-half hour. This permitted the sealing glass to soften, form a seal between the plates and crystallize to form a lead titanate glass-ceramic.

EXAMPLE 5

A similarly frit-bonded laminate could be made by following the procedure of Example 4, but substituting a ZnO-B$_2$O$_3$-SiO$_2$ sealing glass. In this case, the laminate should be held at 750° C. for one hour to effect sealing and subsequent crystallization of the ZnO-B$_2$O$_3$-SiO$_2$ frit. The crystallized material has a thermal coefficient of expansion of about $45 \times 10^{-7}/°C$.

EXAMPLE 6

Twelve layers of a coposite prepreg were stacked in a 0°/0° (uniaxial) orientation. Each layer was composed of silicon carbide fibers embedded in a BaO-MgO-Al$_2$O$_3$-SiO$_2$ powdered glass matrix. The stack was fired at 450° C. to burn out an organic binder. The resulting stack weighed 99.6 grams.

About 40 grams of a blend of 15 weight percent ARCO SC-9 silicon carbide whiskers was dispersed in an isopropanol-water medium and blended with the same powdered glass used with the SiC fibers. The whisker-glass blend was spread evenly over the top of the fiber prepreg stack, and the coated body placed in a graphate consolidation mold. The mold was closed and the charge hot pressed under standard conditions. The mold was heated to 850° C. in about 90 minutes at 60 psi pressure. Temperature and pressure were then increased over a period of an hour to values, respectively, on the ranges of 1200°-1400° C. and 500-3000 psi, and held for ten minutes. Both temperature and pressure were brought back to ambient and the mold opened.

EXAMPLE 7

A faceplate having a thickness over 0.150" was hot pressed from alpha-SiC obtained from Ceradyne. A backing layer of aluminosilicate glass matrix, reinforced with SiC (Nicalon) fibers, was prepared as described is Example 1. The backing layer was at least 0.2" thick and contained up to 50% by weight reinforcing fibers arranged in a 0°/90° orientation. The backing layer and face plate were bonded together by hot pressing as described in Example 6.

EXAMPLE 8

Twenty-four layers of a carbon fiber reinforced glass (Hercules type A PAN-based fiber and an alkali borosilicate glass matrix) were stacked on a SiC faceplate with four intermediate layers of SiC fiber reinforced aluminosilicate glass. After binder removal at 450° C. in nitrogen, the composite was consolidated by hot pressing in a nitrogen atmosphere hot press for 1 minute.

The resulting composite laminate was well bonded to the faceplate with no cracks in the faceplate. Similar experiments without the intermediate layers of SiC fiber reinforced glass resulted in cracking in the SiC faceplate owing to the high thermal expansion mismatch.

We claim:

1. A laminated ceramic structure comprising a facing member bonded to a backing member, the facing member being composed of a very hard ceramic having a KHN$_{100}$ value in excess of 700 kg/mm$^2$ selected from the group consisting of SiC, B$_4$C, TiB$_2$, SiON, and Al$_2$O$_3$, each in monolithic form, and a glass-ceramic reinforced through the presence therein of whiskers, and the backing member being a composite having an impact energy absorbing capacity in excess of 10 KJ/m$^2$ in an unnotched condition composed of a glass or glass-ceramic matrix reinforced through the presence therein of fibers.

2. A laminated ceramic structure in accord with claim 1 wherein the facing member is bonded with the backing member by hot pressing.

3. A laminated ceramic structure in accord with claim 1 wherein the facing and backing members are bonded at least one layer of intermediate material.

4. A laminated ceramic structure in accord with claim 3 wherein the intermediate is a sealing glass.

5. A laminated ceramic structure in accord with claim 3 wherein the intermediate has a thermal coeffi of expansion intermediate to that of the facing and backing members.

6. A laminated ceramic structure in accordance with claim 1 wherein the backing member is a glass or glass-ceramic reinforced with graphite, carbon, or silicon carbide fibers.

7. A laminated ceramic structure in accordance with claim 6 wherein the backing member is composed of a fiber-reinforced aluminosilicate glass.

8. A laminated ceramic structure in accordance with claim 1 wherein the KHN$_{100}$ value of the facing member is in the range of 700 to 3000 kg./mm$^2$.

9. A laminated ceramic structure in accordance with claim 8 wherein the range of KHN$_{100}$ values is 2000 to 3000 kg./mm$^2$.

10. A laminated ceramic structure in accordance with claim 1 wherein the impact energy absorbing capacity of the backing member is in the range of 10–40 KJ/m$^2$.

11. A laminated ceramic structure in accordance with claim 10 wherein the backing member has a typical impact energy absorbing value of 20–30 KJ/m.$^2$.

12. A laminated ceramic structure in accordance with claim 1 wherein the faceplate and backing member have thermal coefficients of expansion that differ by no more than $20 \times 10^{-7}/°C$.

13. A laminated ceramic structure in accordance with claim 1 wherein the facing member is composed of a whisker reinforced glass-ceramic and the backing member is a fiber reinforced glass-ceramic 14. A laminated ceramic structure in accordance with claim 13 wherein the facing member is reinforced with SiC whiskers and the backing member is reinforced with graphite, carbon, or SiC fibers.

* * * * *